Dec. 10, 1968     S. A. HIDER     3,415,714
FOAM-PAPER-COMPOSITION BOARD LAMINATE
Filed Sept. 13, 1965
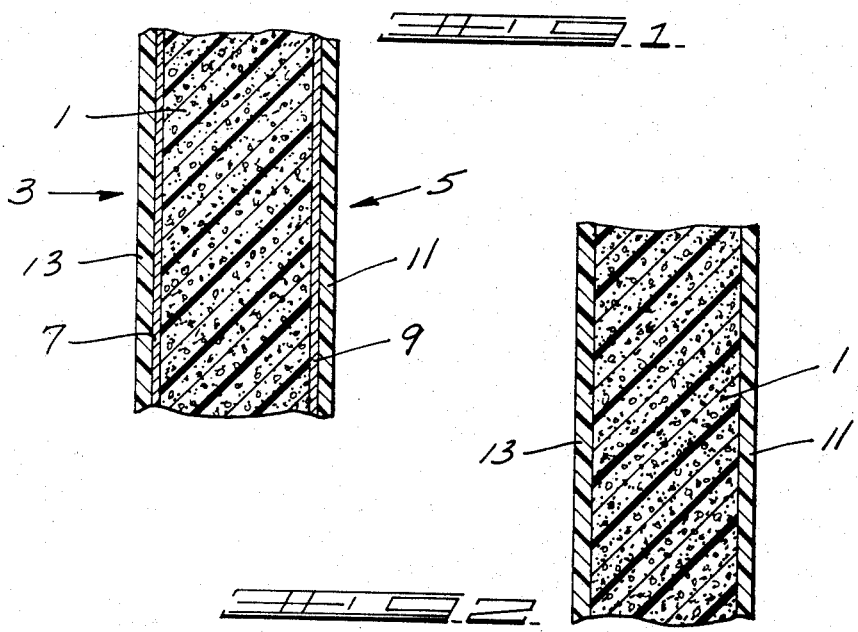
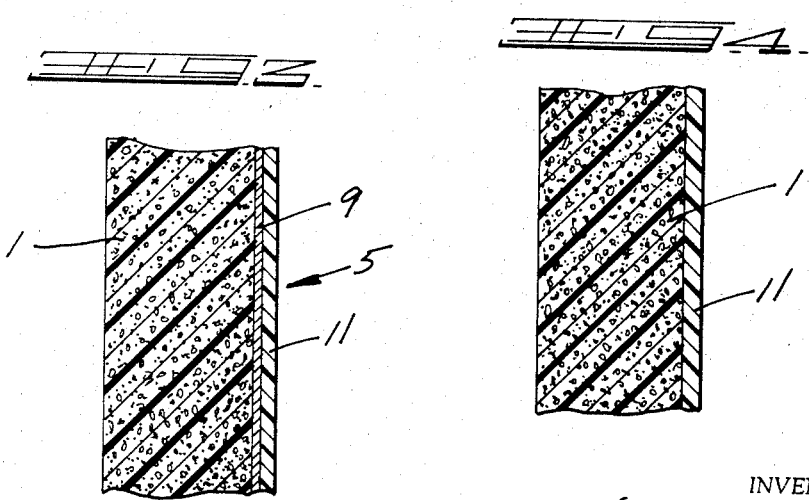
INVENTOR.
SHIRLEY A. HIDER
BY Donald R. Bahr +
W. A. Schaich
ATTORNEYS

United States Patent Office 3,415,714
Patented Dec. 10, 1968

3,415,714
FOAM-PAPER-COMPOSITION BOARD LAMINATE
Shibley A. Hider, Toledo, Ohio, assignor to Owens-Illinois, Incorporated, a corporation of Ohio
Filed Sept. 13, 1965, Ser. No. 486,840
14 Claims. (Cl. 161—161)

This invention relates to foamboard structures. The invention is also concerned with a process for the manufacture of said foamboard and containers which are formed from the product foamboard. More specifically, the invention relates to foamboard structures having a foam portion and one or more composite outer portions which utilize one or more pulp-thermoplastic composition boards.

Foamboards are commonly known in the prior art. These prior art structures have a central foam layer of a foam such as foam polystyrene. To this central foam layer is bonded a rigid or semirigid outer layer of a material such as kraft pine paper, corrugated media or a plastic sheet for example, a polyester sheet. While these prior art structures which have a semirigid outer layer are somewhat adapted for packaging uses, they possess several serious disadvantages. Those prior art structures which utilize a paper base outer layer tend to have very poor wet strength and as such they are not suited for shipment wherein moisture is present. This effectively precludes their use as containers for the shipment of food, produce, etc. However, containers formed from foamboard are particularly suited for the shipment of food due to their insulating qualities. In addition to the poor wet strength mentioned above, these prior art structures which utilize foamboard having paper outer layers, tend to delaminate in the presence of moisture and as such render themselves useless as shipping containers.

Conversely, the prior art foamboard structures which utilize rigid outer layers tend to be somewhat moisture proof but they can not readily be formed into containers such as boxes, cartons, etc. Therefore, their usefulness in the packaging field is rather limited.

In view of the above described disadvantages, in the past food and produce generally have been shipped in wooden boxes or crates. When wooden boxes or crates are used as containers for produce or food, they could be stacked regardless of the presence of moisture. In comparison, corrugated board containers and the prior art foamboard containers failed under such conditions.

Accordingly, it is the object of this invention to produce new and improved foamboard structures and containers formed therefrom which have outstanding wet strength and which do not tend to become delaminated in the presence of moisture. Likewise, another object of this invention includes a process whereby the subject foamboard structures can be readily produced.

I have found that these objects can be achieved by forming a foamboard which has a foam portion and one or more layers which utilize one or more pulp-thermoplastic composition boards.

By one embodiment of this invention, a central foam portion is bonded to two outer composition laminate layers which comprise an inner paper member which is bonded to the central foam member and an outer composition board layer which is formed from wood pulp and thermoplastic material. According to a second embodiment of this invention, two layers of composition board are bonded directly to an inner central foam portion. According to still other embodiments of this invention, the foam portion can be bonded to a single layer which utilizes a pulp-thermoplastic composition board.

Referring to FIGURE 1, the foamboard of this invention has a central foam portion 1. Opposing sides of this central foam portion are bonded directly to two composite laminates 3 and 5. Composite laminate members 3 and 5 in turn, contain inner paper portions 7 and 9 and outer composition board layers 11 and 13.

FIGURE 2 represents the second embodiment of the subject invention. The structure as illustrated in FIGURE 2, also contains a central foam portion 1. Bonded directly to central foam portion 1 are composition board layers 11 and 13. This embodiment is distinguished from the structure as illustrated in FIGURE 1, in that the central foam portion 1 is bonded directly to the composition board layers 11 and 13. FIGURES 3 and 4 represent still other embodiments of the subject invention. In FIGURE 3, foam portion 1 is bonded to a single laminate 5 which comprises a paper-like layer 9 and composition board 11. In FIGURE 4, foam portion 1 is bonded directly to a single composition board 11.

Foam portion 1 comprises a polymeric foam. Foamable polymeric materials which can be utilized in the present invention include synthetic organic polymeric substances, both homopolymeric and copolymeric, such as (1) vinyl resins formed by the polymerization of vinyl halides or by the copolymerization of vinyl halides with unsaturated polymerizable compounds, e.g., vinyl esters, α,β-unsaturated acids, α,β-unsaturated esters, α,β-unsaturated ketones, α,β-unsaturated aldehydes and unsaturated hydrocarbons such as butadienes and styrene; (2) poly-α-olefins such as polyethylene, polypropylene, polybutylene, polyisoprene and the like, including copolymers of poly-α-olefins; (3) polyurethanes such as are prepared from polyols and organic polyisocyanates; (4) polyamides such as polyhexamethylene adipamide; (5) polyesters such as polymethylene terephthalates; (6) polycarbonates; (7) polyacetals; (8) polyethylene oxide; (9) polystyrene including copolymers of styrene with monomeric compounds such as acrylonitrile and butadiene; (10) acrylic resins as exemplified by the polymers of methyl acrylate, acrylamide, methylol acrylamide, acrylonitrile, and copolymers of these with styrene, vinyl pyridines, etc.; (11) neoprene; (12) condensates of aldehydes, especially formaldehyde and formaldehyde engendering substances such as paraformaldehyde; (13) modified and unmodified condensates of hydroxy benzenes like phenol, resorcinol, etc., with the aforementioned aldehydes; (14) silicones such as dimethyl and methyl hydrogen polysiloxanes; (15) unsaturated polyesters; and (16) cellulose esters including the nitrate, acetate, propionate, etc. This list is not meant to be limiting or exhaustive but merely to illustrate the wide range of polymeric materials which may be employed in the present invention.

This central foam portion is produced while a foamable composition is in contact with outer layer members 3 and 5, or while in direct contact with composition board layers 11 and 13. The central foam portion is produced by heating a mixture of a polymer and a blowing agent. During this heating, the blowing agent decomposes or otherwise provides blowing gas at a temperature which is somewhat above the processing point of the polymer. This blowing gas is allowed to expand thereby producing minute cells. The processing point of a polymer is defined as that temperature at which a polymer becomes elastic enough to allow the expansion of the foaming gas thereby permitting the formation of cells. Foamable compositions adapted for use in this invention can comprise a mixture of a granular polymer and a solid blowing agent or a liquid polymer composition in which is entrapped either a solid, liquid or gaseous blowing agent.

Laminate layer members 3 and 5 contain inner paper layers 7 and 9 to which foam layer member 1 is bonded. Inner paper layer members 7 and 9 can comprise a plurality of papers and paperlike products. Examples of paper and paperlike products which are adapted to function as an inner layer member are kraft pine liner, corrugated media, bleached kraft pine, bleached hardwood, etc.

The outer extremeties of laminate layer members 3 and 5 comprise composition boards 11 and 13 which are formed from a mixture of a thermoplastic and a wood pulp. Composition boards of the subject type are commonly known in the prior art. Composition boards 11 and 13 are formed by mixing wood pulp with a thermoplastic and extruding or rolling the same into a sheet.

The prior art pulp-thermoplastic boards are usually produced by the blending of a thermoplastic with a wood pulp. This invention is adapted to the utilization of these prior art composition boards. Superior pulp-thermoplastic boards are produced by the blending of a particulate thermoplastic with cellulosic fibers that have been fibrillated. These fibrillated fibers tend to entrap the particulate thermoplastic material with the result that a superior product is produced. Pulp-thermoplastic boards that are produced from fibrillated pulp-thermoplastic mixtures are fully described in U.S. Patent 3,325,345.

A plurality of wood pulps are adapted for use in preparing composition boards 11 and 13. Any lignocellulosic pulp either bleached or unbleached may be used in the preparation of composition boards 11 and 13. Examples of these pulps include α-cellulose, groundwood pulp, hardwood pulp, softwood pulp, etc. Preferred pulps adapted for the preparation of composition boards 11 and 13 are softwood pulps produced from woods such as pine, spruce, etc.

Outer composition boards 11 and 13 can contain from about 10 to about 80 percent of wood pulp and from about 90 to about 20 percent of a thermoplastic material. A more preferred composition contains from about 40 to about 60 percent of wood pulp and from about 40 to about 60 percent of a thermoplastic material.

In a preferred embodiment of this invention composition boards 11 and 13 contain 50 percent kraft pine wood pulp and 50 percent of polyethylene. Still another preferred embodiment of this invention contains 50 percent kraft pine wood pulp and 50 percent of polystyrene.

Any thermoplastic which will flow under heat and pressure may be utilized in the formation of outer composition boards 11 and 13. Examples of thermoplastics which are suited for use in this phase of the subject invention include both homopolymeric and copolymeric substances, such as (1) vinyl resins formed by the polymerization of vinyl halides or by the copolymerization of vinyl halides with unsaturated polymerizable compounds, e.g., vinyl esters, α,B-unsaturated acids, α,B-unsaturated esters, α,B-unsaturated ketones, α,B-unsaturated aldehydes and unsaturated hydrocarbons such as butadienes and styrenes; (2) poly-α-olefins such as polyethylene, polypropylene, polybutylene, polyisoprene and the like, including copolymers of poly-α-olefins; (3) polyurethanes such as are prepared from polyols and organic polyisocyanates; (4) polyamides such as polyhexamethylene adipamide; (5) polyesters such as polymethyl terephthalates; (6) polycarbonates; (7) polyacetals; (8) polyethylene oxide; (9) polystyrene, including copolymers of styrene with monomeric compounds such as acrylonitrile and butadiene; (10) acrylic resins as exemplified by the polymers of methyl acrylate, acrylamide, methylol acrylamide, acrylonitrile, and copolymers of these with styrene, vinyl pyridines, etc.; (11) neoprene; (12) condensates of aldehydes, especially formaldehyde and formaldehyde engendering substances such as paraformaldehyde; (13) modified and unmodified condensates of hydroxy benzenes like phenol, resorcinol, etc., with the aforementioned aldehydes; (14) silicones such as dimethyl and methyl hydrogen polysiloxanes; (15) unsaturated polyesters; and (16) cellulose esters including the nitrate, acetate, propionate, etc. This list is not meant to be limiting or exhaustive but merely to illustrate the wide range of polymeric materials which may be employed in the present invention.

Outer laminate layer members 3 and 5 are prepared by contacting composition board members 11 and 13 with inner layer members 7 and 9 and applying heat. The application of heat causes inner layer members 7 and 9 to adhere to composition board members 11 and 13 via the thermoplastic component of composition board members 11 and 13. It is obvious to one skilled in the art that outer layer laminate members 3 and 5 can be prepared by a process which utilizes a preformed composition board, also the bonding paper layers 7 and 9 to composition boards 11 and 13 can be effected during the manufacture of said composition board. Likewise, it should be noted that preformed foam can be utilized. When preformed components are utilized the bonding of the various components can be effected by heat alone or by the use of solvents, adhesives, etc. with and without heat. The application of outer paper layer members 7 and 9 to composition board 11 and 13, can be accomplished on a continuous or batch basis utilizing conventional paper coating apparatus.

The product foam board of this invention can be prepared by applying an unfoamed foamable mixture to the inner paper layer member of the laminate structure or by applying said unfoamed foamable mixture directly to composition board members 11 and 13. An identical outer member is then contacted with the unfoamed foamable mixture. If a paper coated laminate layer is utilized, the paper side of the second laminate member is in contact with the unfoamed foamable mixture. Sufficient heat is then applied to effect the adherence of the resulting foam to inner paper layers 7 and 9 or directly to composition boards 11 and 13. A temperature of from about 200° F. to about 400° F. is usually sufficient to effect the desired foaming of conventional foamable compositions.

It is to be noted that the processing point of the polymer used in foam portion 1, and the decomposition point of the blowing agent utilized must be under the decomposition point of the thermoplastic utilized in outer composition boards 11 and 13.

It is obvious to one skilled in the art that the foamboard of this invention can reaidly be manufactured on a batch or continuous basis. That is, the foamboard of this invention can be continuously manufactured utilizing conventional composition paper forming apparatus.

The foamboard of this invention may be slit and folded, slotted and printed to form cartons using the same machinery which is used in the formation of conventional corrugated containers. The foamboard of this invention can be readily cut or scored in such a way as to allow the formation of any shape container. The product foamboard of this invention is particularly advantageous in that when it is folded, the central foam portion 1 does not rupture but instead compresses to form corners having smooth arcuate surfaces. The corners of the container formed from the foamboard of this invention exhibit exceptional toughness and impact resistance when compared to corners which are formed from conventional corrugated media.

The following examples will illustrate the invention. These examples are given for purposes of illustration and not for the purpose of limiting this invention.

Example I

A foamboard consisting of polyethylene foam and pulp-polyethylene sheets was prepared according to the following. The polyethylene foam was first made by blending Marlex–6035, a high density polyethylene of 3.5 melt index with 5 percent Kempore 200, an azodicarbonamide for five minutes at 330° F. on a roller mill. The resulting sheet was pressed flat at 330° F. on a Carver press foamed at 400° F. for four minutes. The pulp-thermoplastic composition boards were prepared by pressing a blend of 60 percent low density polyethylene and 40 percent kraft pulp for 30 seconds at 375° F. and 160 p.s.i.

These pulp-thermoplastic composition boards were then laminated to the foam by heat (2 minutes at 340° F. 30 p.s.i.).

The final foamboard had a caliper of .141 inch, a dry short column of 604 pounds, wet short column of 479 pounds. The density of the resulting foamboard was 46 pounds per cubic foot as compared to 32.7 pounds for the foam only.

The test methods were:

Density.—A.S.T.M.-D1622–59T

Short Column Test.—McKee, Gander and Wachuta, "Edge-wise compression strength of corrugated board," Paperboard Packaging, November 1961, pages 70–76.

Example II

A foamboard was prepared from polyethylene foam and pulp-polystyrene composition boards. The polyethylene foam was formed from Marlex and Kempore 200, as in Example I.

The 60 percent pulp-40 percent polystyrene composition boards were pressed one minute at 390° F. and 470 p.s.i. to make a uniform blended stiff board. These boards were then adhered to the foam by a three-minute exposure to heat of 380°, without pressure.

The final composite, tested by the same procedure as Example I, showed the following results:

Caliper _____ inches __ 0.062
Short column dry _____ lbs __ 356
Short column wet _____ lbs __ 339
Density _____ lbs. per cu. ft __ 50

Example III

A foamboard was prepared from polystyrene foam and pulp-polystyrene composition boards. The polystyrene was purchased in slab form at 1.1 pounds per cubic foot. An epoxy cement consisting of Epon 828 (Shell rim) and Versamid-140 was used to glue the foam to the sheets. The cement was cured for one hour at 70° C. The sheets were made by laminating two pulp-polystyrene composition boards for one minute at 390° F. at 47 p.s.i. The final boards tested by the same methods as in Example I, showed the following test results:

Caliper _____ inches __ 0.377
Short column dry _____ 280
Short column wet _____ 160
Density _____ lbs. per cu. ft __ 8.0

The density of the foam alone was 1.1 pound per cubic foot.

Example IV

A foamboard was prepared from polystyrene foam and polyethylene-pulp composition boards. In this case a thin kraft liner was adhered to the prepressed pulp-plastic composition boards and placed next to the foam.

The same polystyrene foam was used as in Example III. The composition boards consisting of 60 percent low density polyethylene and 40 percent kraft pulp were laminated to one thin kraft liner (26 pound weight) by pressing three minutes at 390° F. and 230 pounds. Then the foam was cemented to these sheets with the same epoxy cement as used on Example III and cured to set the cement. The finished composites had the following properties as tested by the same methods as described in Example I. The caliper was 0.413 inch, the short column dry was 310, wet 186 and the density was 8.9 pounds per cubic inch as compared to 1.1 for the foam alone.

Example V

A foamboard was prepared from polyvinyl foam with only one composition board of pulp-polyvinyl chloride laminated to a kraft liner as in Example IV.

The polyvinyl chloride foam was made from a commercial polyvinyl chloride containing a blowing agent, Houdry's PS-100. It was foamed between aluminum foil with only one Teflon sheet (1/16 inch thick) on each side to keep the foam surface level. This assembly was placed in a draft oven for five minutes at 400° F. which caused foaming.

The pulp plastic composition board was made from pulp polyvinyl chloride (1/1) pressed to a thin kraft pulp liner for two minutes at 320° F. at 150 p.s.i. This laminate was glued to the vinyl foam by the same epoxy cement, used in Examples III and IV.

The test results of the composites were:

Caliper _____ 0.252
Short column dry _____ 56
Short column wet _____ 24
Density, lbs. per cu. ft _____ 18.4
Density _____ lbs. per cu. ft __ 18.4 as compared to density of the foam alone of 19.0 pounds per cubic foot. The results are lower than for the previous examples, since the foam was only supported by a stiff liner on one side.

The following Table I compares the results of the above examples with polyurethane board and shows the higher wet strength extension of the new pulp-plastic-foam combinations.

These foamboards are compared with a polyurethane foamboard made semi-commercially from a ¼ inch polyurethane foam and 42-pound kraft liners as outer skins.

TABLE I

| | Caliper | Density | Short column | | Percent retention |
|---|---|---|---|---|---|
| | | | Dry | Wet | |
| Example I | .141 | 46. | 604 | 477 | 80 |
| Example II | .062 | 50. | 356 | 339 | 95 |
| Example III | .377 | 8.0 | 280 | 160 | 57 |
| Example IV | .413 | 8.9 | 310 | 186 | 60 |
| Example V | .252 | 18.4 | 56 | 24 | 43 |
| Polyurethane foam. | .290 | 2.4 | 120 | 31 | 26 |
| Kraft liner | .280 | 2.6 | 123 | 28 | 23 |

What is claimed is:

1. An article of manufacture comprising a foamboard having a polymeric foam layer selected from the group consisting of foamed polyurethane, polystyrene, polyvinyl halide and poly-$\alpha$-olefin, said foam portion being bonded to the paper side of at least one laminate comprising a paper liner selected from the group consisting of kraft pine paper, corrugated media, bleached kraft pine paper and bleached hardwood paper; and a composition board which is formed from a wood pulp selected from the group consisting of $\alpha$-cellulose, groundwood, hardwood and softwood and a thermoplastic selecting from the group consisting of poly-$\alpha$-olefin, polystyrene, polyvinyl halide and polyamide.

2. The article of claim 1, wherein the foam layer is bonded directly to two composition boards.

3. An article of manufacture comprising foamboard having a polymeric foam layer selected from the group consisting of foamed polyurethane, polystyrene, polyvinyl halide or poly-$\alpha$-olefin; said foam portions being bonded to the paper side of at least one laminate comprising a paper liner selected from the group consisting of kraft pine paper, corrugated media, bleached kraft pine paper and bleached hardwood paper and a composition board which is formed from about 40 to about 60 percent of a wood pulp selected from the group consisting of $\alpha$-cellulose, groundwood, hardwood and softwood and from about 60 to about 40 percent of a thermoplastic selected from the group consisting of poly-$\alpha$-olefin, polystyrene, polyvinyl halide, and polyamide.

4. The article of claim 3, wherein the foam layer is bonded directly to two composition boards.

5. An article of manufacture comprising a foamboard having a polyurethane foam layer; said foam layer being bonded directly to the kraft pine liner side of at least one laminate comprising a kraft pine liner and a composition board which is formed from about 40 to about 60 percent of kraft pine pulp and from about 60 to about 40 percent of polyethylene.

6. The article of claim 5, wherein the foam layer is bonded directly to two composition boards.

7. An article of manufacture comprising a foamboard having a polyethylene foam layer; said foam layer being bonded to the kraft pine liner side of at least one laminate comprising a kraft pine liner and a composition board which is formed from about 40 to about 60 percent of bleached soda hardwood pulp and from about 60 to about 40 percent polyethylene.

8. The article of claim 7, wherein the foam layer is bonded directly to two composition boards.

9. An article of manufacture comprising a foamboard having a polystyrene foam layer; said foam layer is being bonded to the kraft pine liner side of at least one laminate comprising a kraft pine liner and a composition board which is formed from about 40 to about 60 percent of mixed hardwood pulp and from about 60 to about 40 percent of polyethylene.

10. The article of claim 9, wherein the foam layer is bonded directly to two composition boards.

11. An article of manufacture comprising a foamboard having a polyvinyl chloride foam layer; said foam layer being bonded to the kraft pine liner side of at least one laminate comprising a kraft pine liner and a composition board which is formed from about 40 to about 60 percent of kraft pine pulp and from about 60 to about 40 percent of polyethylene.

12. The article of claim 11, wherein the foam layer is bonded directly to two composition boards.

13. An article of manufacture comprising a foamboard having an epoxy foam layer; said foam layer being bonded to the kraft pine liner side of at least one laminate comprising a kraft pine liner and a composition board which is formed from about 40 to about 60 percent of bleached hardwood pulp and from about 60 to about 40 percent of polyethylene.

14. The article of claim 13, wherein the foam layer is bonded directly to two composition boards.

References Cited

UNITED STATES PATENTS

| | | | |
|---|---|---|---|
| 2,728,702 | 12/1955 | Simon et al. | 156—79 |
| 2,770,406 | 11/1956 | Lane | 161—161 |
| 2,866,730 | 12/1958 | Potchen et al. | 156—79 |
| 3,070,817 | 1/1963 | Kohrn et al. | 161—161 |
| 3,278,365 | 10/1966 | Adams et al. | 161—251 |

ROBERT F. BURNETT, *Primary Examiner.*

WILLIAM J. VAN BALEN, *Assistant Examiner.*

U.S. Cl. X.R.

161—160; 156—79; 264—261